United States Patent [19]

Inoue et al.

[11] Patent Number: 4,982,102
[45] Date of Patent: Jan. 1, 1991

[54] APPARATUS FOR DETECTING THREE-DIMENSIONAL CONFIGURATION OF OBJECT EMPLOYING OPTICAL CUTTING METHOD

[75] Inventors: Yasuo Inoue; Yasuo Yamaguchi, both of Itami, Japan

[73] Assignee: Mitsubishi Denki Kabushiki Kaisha, Japan

[21] Appl. No.: 424,924

[22] Filed: Oct. 23, 1989

[30] Foreign Application Priority Data

Jun. 27, 1989 [JP] Japan .................................. 1-162665

[51] Int. Cl.$^5$ .............................................. G01B 11/24
[52] U.S. Cl. ..................................... 250/560; 356/376
[58] Field of Search ............... 250/560, 561; 356/376, 356/377, 375; 364/559; 358/107

[56] References Cited

U.S. PATENT DOCUMENTS 4,595,294 6/1986 Ohki et al. ........................... 356/375
4,794,262 12/1988 Sato et al. ............................ 250/560

Primary Examiner—Edward P. Westin
Attorney, Agent, or Firm—Leydig, Voit & Mayer

[57] ABSTRACT

Disclosed is an apparatus for detecting the three-dimensional configuration of an object employing an optical cutting method. A light projector pulse-flashes slit-shaped light and causes the light to scan an object at a predetermined speed. An image sensor having a plurality of pixels is disposed in opposition to the object. An optical system forms on the image sensor an image of an optical cutting line formed on the surface of the object by the light. Counters each count the number of pulses of the image of the optical cutting line that has been detected by each pixel. A time calculator calculates the time at which the image has passed each of the pixels, on the basis of the counted numbers of pulses. A configuration calculator calculates the three-dimensional configuration of the object on the basis of the calculated passage time and the scanning speed of the slit-shaped light. Because the counted numbers of pulses, which are each indicative of the period of time required for the image of the optical cutting line to pass each pixel, are used to calculate the passage time, there is no need to provide a data bus to transmit time data with respect to the each pixel. Thus, the apparatus has simple wiring arrangement, and can be manufactured with ease.

4 Claims, 3 Drawing Sheets

APPARATUS FOR DETECTING THREE-DIMENSIONAL CONFIGURATION OF OBJECT EMPLOYING OPTICAL CUTTING METHOD

CROSS REFERENCE TO RELATED APPLICATION

This application is related to a copending U.S. patent application Ser. No. 07/424,979 by Yasuo Inoue and Tadashi Nishimura, filed on the same day as the present application, having a title of "APPARATUS FOR DETECTING THREE-DIMENSIONAL CONFIGURATION OF OBJECT EMPLOYING OPTICAL CUTTING METHOD".

BACKGROUND OF THE INVENTION

1. Field of the Invention

The present invention relates to an apparatus for detecting the three-dimensional configuration of an object employing an optical cutting method.

2. Description of the Related Art

FIG. 3 schematically shows a conventional apparatus for measuring the three-dimensional configuration of an object by an optical cutting method. The apparatus includes a laser source 1 and a rotary mirror 3 disposed ahead of the laser source 1, with a cylindrical lens 2 disposed therebetween. An object 4 to be measured is placed ahead of the rotary mirror 3. An image sensor 5 is disposed in opposition to the object 4. A determination section 6 is connected to the image sensor 5, and a memory section 7 is connected to the determination section 6. The apparatus further includes an optical lens 8 for forming an image of the object 4 on the image sensor 5, which is disposed between the object 4 and the image sensor 5.

An optical detector 9 is disposed in the vicinity of the rotary mirror 3 in order to detect a reference angle of the mirror 3. A counter 10 is connected to the optical detector 9, and the output of the counter 10 is connected to the memory section 7 via a data bus 11. A data processor 13 is connected to the memory section 7 via a data bus 12.

The image sensor 5 has a plurality of pixels 5a which are arranged on an X-Y plane when the axis connecting the image sensor 5 and the object 4 is assumed to be a Z axis. The determination section 6 and the memory section 7 have a plurality of comparators 6a and a plurality of memories 7a, respectively, which are arranged in one-to-one correspondence with each of the pixels 5a of the image sensor 5.

The conventional apparatus having the above-described construction operates in the following manner. A laser beam is radiated from the laser source 1 and, simultaneously, the rotary mirror 3 is rotated about the Y axis at an angular velocity $\omega$. The laser beam radiated from the laser source 1 is diverged in the direction of the Y axis by the cylindrical lens 2, and it is then reflected by the rotary mirror 3, whereupon it forms a slit-shaped irradiation beam 14. The irradiation beam 14 rotates at the angular velocity $\omega$ as the rotary mirror 3 rotates. When the irradiation beam 14 passes through the optical detector 9, a detection signal is output from the optical detector 9 to the counter 10. Upon receiving this signal, the counter 10 starts to measure time. Thereafter, time data indicative of the time t reached every moment is momently output from the counter 10 to the memory section 7 via the data bus 11.

When the rotary mirror 3 further rotates and the slit-shaped irradiation beam 14 irradiates the object 4, the irradiation beam 14 scans the surface of the object 4 as the beam simultaneously forms an optical cutting line 15 on the surface of the object 4. At this time, an image 16 of the optical cutting line 15 is projected onto the image sensor 5 through the optical lens 8. Each comparator 6a of the determination section 6 makes a determination on the basis of an output signal from the corresponding pixel 5a of the image sensor 5 as to the passage of the image 16 of the optical cutting line 15 through the corresponding pixel 5a. When each comparator 6a determines that the image 16 of the optical cutting line 15 has passed the corresponding pixel 5a, the comparator 6a outputs a trigger signal to the associated memory 7a of the memory section 7, whereby the time data that is on the data bus 11 at this time is stored in the memory 7a.

When items of data which are each indicative of the time t reached at the time of the passage of the image 16 of the optical cutting line 15 through each of the pixels 5a have been stored into the corresponding memories 7a in this way, these items of data, each indicative of the passage time, are read by the data processor 13 via the data bus 12. Because the angle $\alpha$ by which the slit-shaped irradiation beam 14 deviates from the reference angle at a time t reached is expressed by: $\alpha = \omega$, it is possible to express the irradiation beam 14 in the form of a plane equation in which the time t reached is used. Furthermore, a point on the image 16 projected on the image sensor 5 corresponds to one point on the surface of the object 4, and these points are positioned on the same line passing through the center of the optical lens 8. Therefore, from the equation expressing this line and a plane equation expressing the irradiation beam 14, the spatial coordinates of a certain point on the object 4 which corresponds to one point of the image 16 being projected on the image sensor 5 are calculated. The configuration and the position of the object 4 are calculated by the data processor 13 employing the above-described method.

As shown in FIG. 3, each of the memories 7a of the memory section 7 has to be connected with the data bus 11 through which time data is input to the memory 7a from the counter 10, and also with the data bus 12 through which time data stored in the memory 7a is output to the data processor 13. In order to transmit practically usable time data, it is necessary to use, as each of these data buses, a 16-bit data bus or a data bus of a similar capacity. Therefore, each of the memories 7a must be connected with at least thirty-two signal lines, and this leads to very complicated wiring arrangement. This in turn leads to very complicated manufactured of the entire three-dimensional configuration detecting apparatus.

A similar problem is encountered particularly when the image sensor 5, the determination section 6, and the memory section 7 are laminated and are formed as a single chip, although the adoption of this arrangement makes it possible to obtain a device possessing excellent applicability. If each of the pixels 5a of the image sensor 5 has a side length of, e.g., 50 $\mu$m, while the wiring involves a line or space width of, e.g., 1 $\mu$m, each of the memories 7a, to which at least thirty-two signal lines have to be connected, must have a width of 64 $\mu$m at least, such a memory being greater than a single pixel 5a. Thus, it has been difficult to achieve a device, such as that described above, without employing a complicated structure, for instance, a structure where wiring layers are formed into multiple layers.

SUMMARY OF THE INVENTION

The present invention has been made to overcome the above-described problem. It is an object of the present invention to provide an apparatus for detecting the three-dimensional configuration of an object employing an optical cutting method that has simple wiring arrangement and can be manufactured with ease.

An apparatus for detecting the three-dimensional configuration of an object employing an optical cutting method in accordance with the present invention comprises: light projecting means for pulse-flashing slit-shaped light and for causing the light to scan the object at a predetermined speed; an image sensor disposed in opposition to the object and having a plurality of pixels; an optical system for forming on the image sensor an image of an optical cutting line formed on the surface of the object by the slit-shaped light; counting means for counting the number of pulses of the image of the optical cutting line that has been detected by each of the pixels of the image sensor; time calculating means for calculating the time at which the image of the optical cutting line has passed each of the pixels of the image sensor, on the basis of the number of pulses of the image of the optical cutting line that has been counted by the counting means with respect to each of the pixels; and configuration calculating means for calculating the three-dimensional configuration of the object on the basis of the time of passage of the image of the optical cutting line through each of the pixels, the time having been calculated by the time calculating means, and on the basis of the scanning speed of the slit-shaped light.

BRIEF DSCRIPTION OF THE DRAWINGS

DESCRIPTION OF THE PREFERRED EMBODIMENTS

Embodiments of the present invention will be described hereunder with reference to the accompanying drawings.

Figure 1:
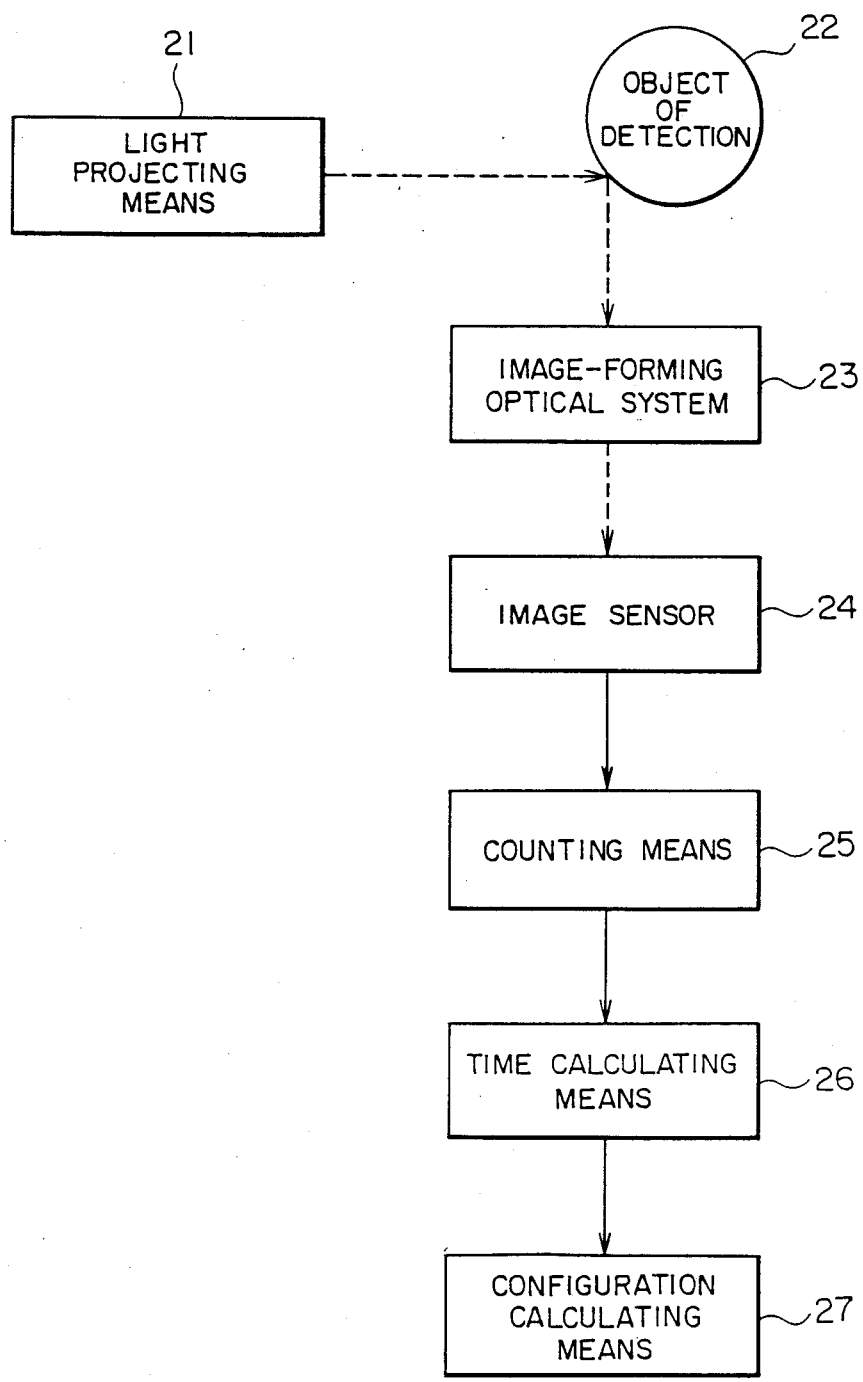
FIG. 1 is a block diagram showing an apparatus for detecting the three-dimensional configuration of an object employing an optical cutting method, in accordance with one embodiment of the present invention.
Figure 3:
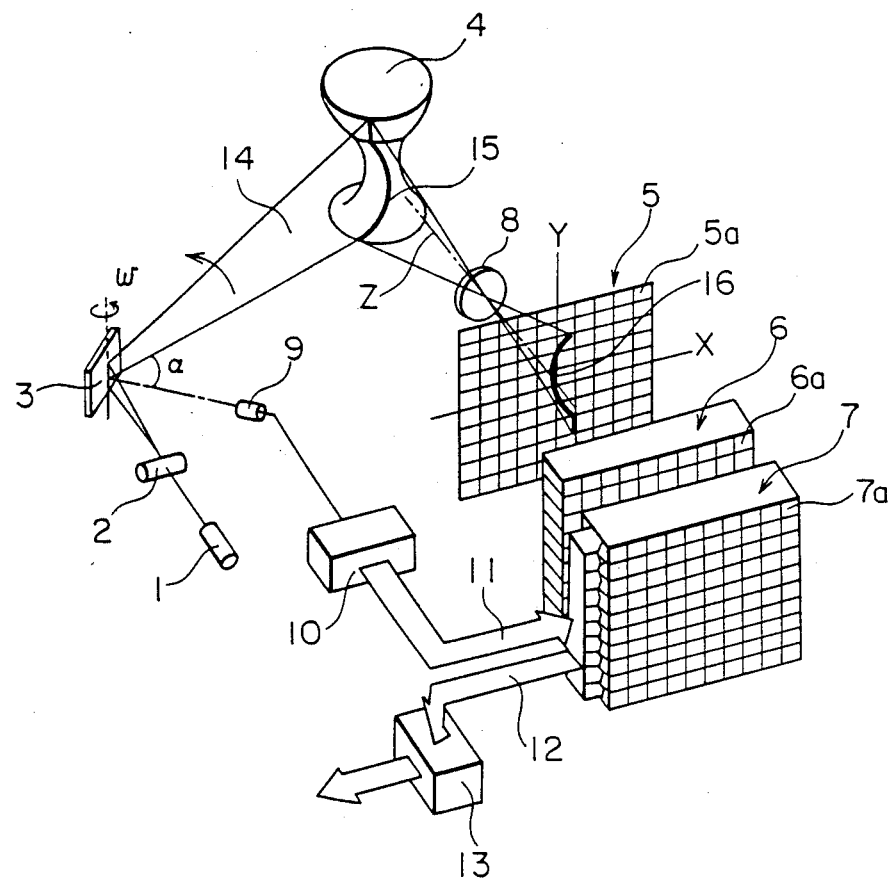
FIG. 3 is a perspective view showing a conventional three-dimensional configuration detecting apparatus.

Referring to FIG. 1, a light projecting means 21 is provided for pulse-flashing slit-shaped light, for causing the light to irradiate an object 22 of detection, and for causing the irradiating light to scan the surface of the object 22. Specifically, the light projecting means 21 comprises members corresponding to the laser source 1, the cylindrical lens 2, and the rotary mirror 3, which constitute the conventional apparatus shown in fig. 3, and also comprises a control circuit (not shown) for causing the laser source 1 to pulse-oscillate.

An image sensor 24 is disposed in such a manner as to oppose the object 22, with an image-forming optical system 23 disposed therebetween. The image-forming optical system 23 includes an optical lens and is operable to form, on the image sensor 24, an image of an optical cutting line formed on the surface of the object 22 of detection by the slit-shaped irradiation light. The image sensor 24 has a plurality of pixels arranged two-dimensionally on an X-Y plane normal to a Z axis connecting the image sensor 24 and the object 22, this construction being similar to that of the image sensor 5 shown in FIG. 3. The image sensor 24 detects an image of the optical cutting line as the image is being formed thereon by the image-forming optical system 23.

A counting means 25 is connected to the image sensor 24. The counting means 25 counts the number of pulses of the image of the optical cutting line that has been detected by each of the pixels of the image sensor 24.

A time calculating means 26 is connected to the counting means 25, and is operable to calculate the time at which the image of the optical cutting line has passed each of the pixels of the image sensor 24, on the basis of the number of pulses of the image of the optical cutting line that has been counted by the counting means 25 with respect to each of the pixels. Furthermore, a configuration calculating means 27 is connected to the time calculating means 26, and is operable to calculate the three-dimensional configuration of the object 22 using the time of passage of the optical cutting line through each of the pixels that has been calculated by the time calculating means 26. Each of the time calculating means 26 and the configuration calculating means 27 comprises a computer such as a microprocessor.

Next, operation will be described.

First, the light projecting means 21 operates in such a manner that slit-shaped irradiation light is pulsed-flashed at a predetermined frequency as the light is simultaneously rotated at a predetermined angular velocity $\omega$, and the light is caused to scan the surface of the object 22 of detection. The slit-shaped irradiation light forms an optical cutting line on the surface of the object 22, and an image of the optical cutting light is formed on the image sensor 24 by the image-forming optical system 23. At this time, since the irradiation light is pulse-flashed, the image of the optical cutting line being formed on the image sensor 24 also undergoes pulsed flashing. As a result, when an image of the optical cutting line is detected by each of the pixels of the image sensor 24, a pulse-shaped detection signal is output from each of the pixels. At this time, however, since the image of the optical cutting line being formed on the image sensor 24 simultaneously moves as the scanning irradiation light moves, a pulse-shaped detection signal is output from each of the pixels only during the period in which the image of the optical cutting line is passing the pixel.

On the basis of the pulse-shaped detection signal output from each of the pixels of the image sensor 24, the counting means 25 counts the number of pulses of the image of the optical cutting line that has been detected by each of the pixels.

In this way, when the scanning of the object 22 by the slit-shaped irradiation light has been completed, the time calculating means 26 calculates the time at which the image of the optical cutting line has passed each of the pixels, on the basis of the number of pulses of the image that has been counted by the counting means 25 with respect to each of the pixels. Since the slit-shaped irradiation light is pulse-flashed at a predetermined frequency, a number of pulses of an image detected by one pixel of the image sensor 24 indicates the period of time required for the image of the optical cutting line to pass through the pixel. Therefore, when it is assumed that the image of the optical cutting line moves on the image sensor 24 and in the X axis direction as the irradiation light proceeds with scanning, the time at which the image has passed each of the pixels can be calculated by summing up all the numbers counted with respect to those pertinent pixels which are, among the entire pixels arranged in a row extending in the X axis direction, each particular pixel and those positioned upstream thereof.

After the time of passage of the image of the optical cutting line through each of the pixels of the image sensor 24 has been calculated, the configuration calculating means 27 calculates, from a plane equation expressing the slit-shaped irradiation light and from an equation expressing the line connecting each of the pixels and the center of the image-forming optical system 23, the spatial coordinates of each of various points on the surface of the object 22, thereby detecting the configuration of the object 22.

As described above, according to this embodiment, because the time at which the image of the optical cutting line passes through each of the pixels of the image sensor 24 is calculated by counting the number of pulses of the image detected by each of the pixels, there is no need to provide a data bus which has been conventionally provided to input time data with respect to the each of the pixels. Therefore, the circuit arrangement of the apparatus can be much simplified.

Figure 2:
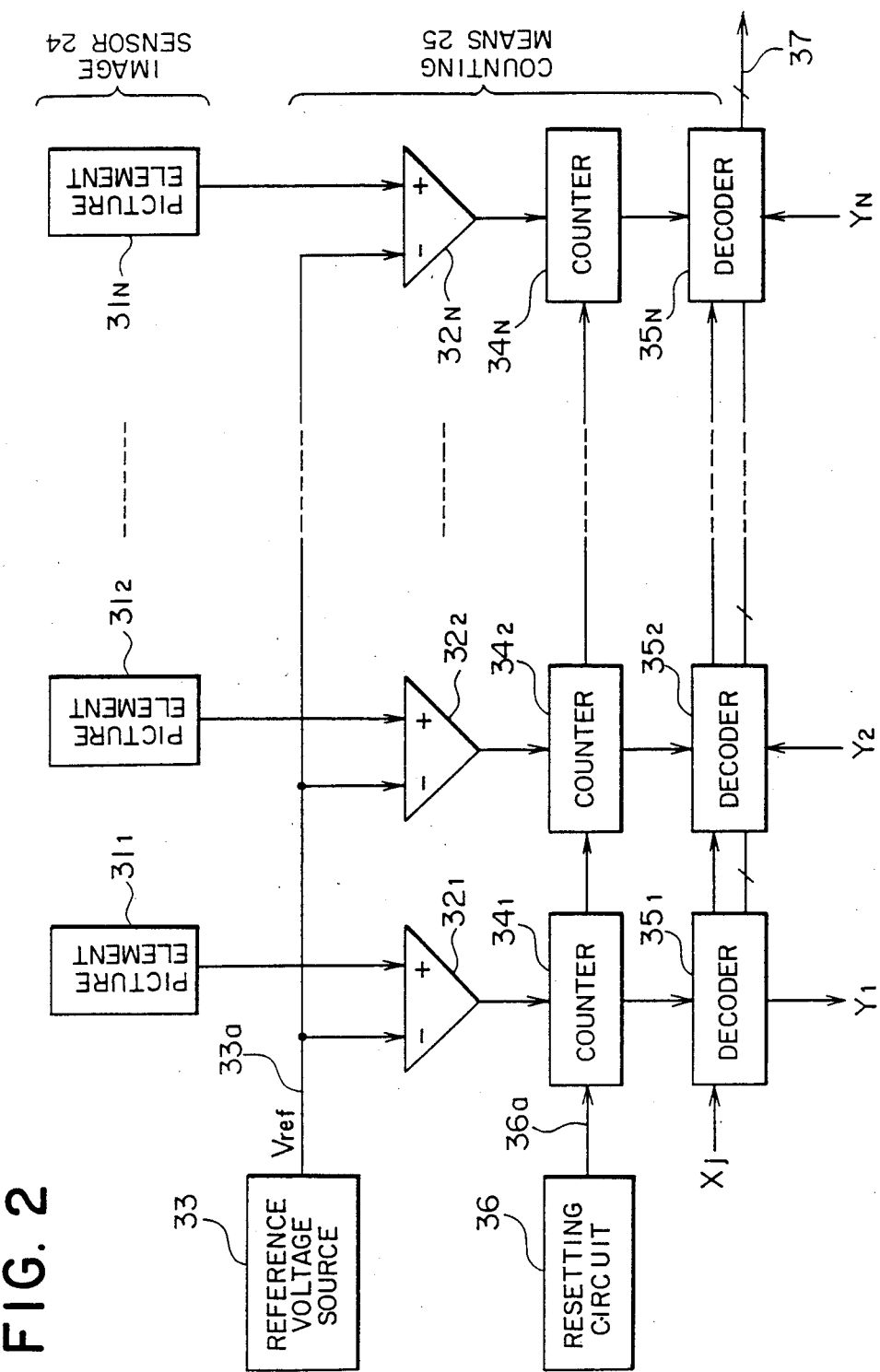
FIG. 2 is a current diagram showing a specific example of essential parts of the apparatus shown in FIG. 1.

FIG. 2 shows a specific example of the arrangement of a circuit including the image sensor 24, and the counting means 25. The image sensor 24 has N pixels $31_1$ to $31_N$ which each comprises, e.g., a photo-sensor and which form one pixel row extending in the direction of the X axis. Each of the pixels $31_1$ to $31_N$ is connected to each of the respective first input terminals of difference amplifiers $32_1$ to $32_N$. The difference amplifiers $32_1$ to $32_N$ have their respective second input terminals connected to a reference voltage source 33 via a reference voltage supply line 33a, the voltage source 33 being connected commonly to these difference amplifiers $32_1$ to $32_N$. The respective output terminals of the difference amplifiers $32_1$ to $32_N$ are each connected to counters $34_1$ to $34_N$, which are in turn connected to decoders $35_1$ to $35_N$. A resetting circuit 36 is connected to each of the counters $34_1$ to $34_N$ via a resetting signal line 36a. The difference amplifiers $32_1$ to $32_N$, the reference voltage source 33, the coumters $34_1$ to $34_N$, the decoders $35_1$ to $35_N$, and the resetting circuit 36 form the counting means 25. FIG. 2 illustrates a circuit solely corresponding to one pixel row extending in the X axis direction, for instance, to a jth row of pixels. In practice, a plurality of circuits having the same arrangement are arranged in the Y axis direction. However, each of the reference voltage source 33, and the resetting circuit 36 is provided commonly with respect to all the two-dimensionally arranged difference amplifiers and the counters.

Next, the operation of this specific example will be described.

At the start of scanning by slit-shaped irradiation light, the resetting circuit 36 outputs a resetting signal to the counters $34_1$ to $34_N$, whereby the value held by each of the counters $34_1$ to $34_N$ is reset to its initial value 0. The irradiation light forms an optical cutting line on the surface of the object 22 of detection, and an image of the optical cutting line is formed on the image sensor 24. It is assumed here that, as the irradiation light scans the surface of the object 22, the image of the optical cutting line moves on the image sensor 24 and in the direction of the X axis from the pixel $31_1$ to the pixel $31_N$.

When the ith pixel $31i$, among the pixels $31_1$ to $31_N$, detects an image of the optical cutting line, a detection signal output from this pixel $31i$ is compared by the associated difference amplifier $32i$ with a reference voltage Vref supplied from the reference source 33. If the level of the detection signal is greater than the reference voltage Vref, the difference amplifier $32i$ determines that the pixel $31i$ has detected the image of the optical cutting line, and outputs a high-level signal. By this action, the associated counter $34i$ increments its count value by 1. Since the image of the optical cutting line undergoes pulsed flushing each time the image flashes, the difference amplifier $32i$ makes a determination as to the level of the detection signal and outputs a signal to the counter $34i$. As a result, the number of pulses of the flashing image is counted by the counter $34i$ during the period in which the image of the optical cutting line is passing the pixel $31i$.

In this way, the numbers of the image of the optical cutting line detected by the pixels $31_1$ to $31_N$ are counted by the corresponding counters $34_1$ to $34_N$. Thereafter, the numbers counted by the counters $34_1$ to $34_N$ are each transmitted to the time calculating means 26 via the associated decoders $35_1$ to $35_N$. At this time, the decoders $35_1$ to $35_N$ are sequentially designated by means of an address line Xj indicating that these decoders $35_1$ to $35_N$ correspond to the jth pixel row and by means of address lines $Y_1$ to $Y_N$ each pertaining to the Y direction. The numbers counted are each transmitted via a data bus 37, such as a 16-bit data bus.

Descriptions will now be given below concerning an example of a time calculating operation by the time calculating means 26. The period of time which elapses during one scanning operation by the irradiation light is expressed as TO, the count value of the counter $34i$ connected to the ith pixel $34i$ is expressed as ni, and the flashing period of pulses is expressed as t. It is assumed that the first pulse and the last pulse in one scanning operation are detected by the first pixel $31i$ and the nth pixel $31_N$, respectively. The total number of times of pulse-flashing during one scanning operation is expressed as TO/t. The total of the numbers counted by the counters from the first counter $34_1$ to the ith counter $34i$ is expressed as Σnk, while the total sum of the numbers counted by the N counters $34_1$ to $34_N$ is expressed as Σnk. It is considered that a case is possible where an image of the optical cutting line is formed on a plurality of adjacent pixels. In such cases, the following relationship stands: Σnk > TO/t. From the above-stated facts, the time point Ti at which the image of the optical cutting line passes the ith pixel $31i$ is expressed by the following equation if the scanning operation is started at a time point0:

$$Ti = TO \times (\Sigma nk + ni/2)/\Sigma nk \qquad (1)$$

On the basis of the passage time Ti calculated from the equation (1), the spatial coordinates of each of various points of the object 22 of detection are calculated by the configuration calculating means 27.

By virtue of the arrangement shown in FIG. 2, it suffices if each of the pixels arranged in one row extending in the X axis direction is connected with the data bus 37, such as a 16-bit data bus, the reference voltage supply line 33a, the resetting signal line 36a, and the address line Xj, in other words, with nineteen signal lines in total. Accordingly, if wiring is effected with a line or space width of 1 µm, one pixel row has a wiring width of 38 µm. This enables both the counting means 25 and the image sensor 24, e.g., an image sensor having pixels each with a side length of 50 µm to be laminated and formed as a single chip with ease.

Various elements of the circuit shown in FIG. 2, such as the pixels $31_1$ to $31_N$, the difference amplifiers $32_1$ to $32_N$, the counters $34_1$ to $34_N$, and the decoders $35_1$ to $35_N$, may not be laminated, and they may alternatively be arranged two-dimensionally.

When the object 22 of detection is smaller than the scanning range of the irradiation light, only part of the pulses during one scanning operation is detected by part of the pixels $31_1$ to $31_N$. In this case, an arrangement, such as the following, may be adopted. A common output line is extended from the difference amplifiers $32_1$ to $32_N$ and is connected to the time calculating means 26. The time calculating means 26 measures the period of time elapsed from the time at which a part of the pixel row detects a pulse for the first time to the time at which a part of the same detects a pulse for the last time. The thus measured time is used in place of TO in the equation (1).

What is claimed is:

1. An apparatus for detecting the three-dimensional configuration of an object employing an optical cutting method comprising:
   light projecting means for pulse-flashing slit-shaped light and for causing said light to scan said object at a predetermined speed;
   an image sensor disposed in opposition to said object and having a plurality of pixels;
   an optical system for forming on said image sensor an image of an optical cutting line formed on the surface of said object by said slit-shaped light;
   counting means for counting the number of pulses of the image of the optical cutting line that has been detected by each of said pixels of said image sensor;
   time calculating means for calculating the time at which the image of the optical cutting line has passed each of said pixels of said image sensor, on the basis of the number of pulses on the image of the optical cutting line that has been counted by said counting means with respect to each of said pixels; and
   configuration calculating means for calculating the three-dimensional configuration of said object on the basis of the time of passage of the image of the optical cutting line through each of said pixels, said time having been calculated by said time calculating means, and on the basis of the scanning speed of said slit-shaped light.

2. An apparatus according to claim 1, wherein said counting means comprises a plurality of difference amplifiers which are each connected to each of said pixels of said image sensor and which each compare the level of a detection signal of the corresponding pixel with a predetermined level, and also comprises a plurality of counters which are each connected to each of said difference amplifiers and which each count the number of pulses of an output signal of the associated difference amplifier.

3. An apparatus according to claim 1, wherein each of said time calculating means and said configuration calculating means comprises a computer.

4. An apparatus according to claim 1, wherein said light projecting means comprises laser oscillating means for oscillating a laser beam, a cylindrical lens for diverging in one direction the laser beam oscillated by said laser oscillating means, and a rotary mirror for causing scanning by the laser beam diverged by said cylindrical lens.

* * * * *